3,513,192
PROCESS FOR MANUFACTURING TEREPHTHALIC ACID BY OXIDATION OF PARA-XYLENE
Daniel Lumbroso, 30 Avenue du General de Gaulle 78, Le Vesinet, Yvelines, France
No Drawing. Continuation-in-part of application Ser. No. 588,720, Oct. 24, 1966. This application Aug. 13, 1969, Ser. No. 849,883
Int. Cl. C07c *63/02*
U.S. Cl. 260—524                    6 Claims

ABSTRACT OF THE DISCLOSURE

The present invention relates to a method of obtaining improved yields of terephthalic acid by the oxidation of paraxylene in liquid phase by means of an oxygen-containing gas, in carboxylic acid solvents, at a temperature between 80 and 200° C., in the presence of a catalyst comprising a transition metal compound, said oxidation being effected in the presence of a mixture of 0.15 to 0.5 part, by weight, of a methylalkylketone having 3–20 carbon atoms and 0.0001 to 0.1 part, by weight, of a saturated aliphatic aldehyde having 2–20 carbon atoms, for each part, by weight of paraxylene.

---

This application is a continuation-in-part of my prior patent application Ser. No. 588,720, filed Oct. 24, 1966, now abandoned.

This invention relates to an improved process for manufacturing terephthalic acid by oxidation of para-xylene.

It is known that, when reacting molecular oxygen with para-xylene in liquid phase, in a carboxylic acid solvent such as acetic acid, at a temperature between 80 and 200° C. and in the presence of a catalyst consisting of a transition metal compound, for example a cobalt or manganese salt, as defined hereafter, it is possible to obtain paratoluic acid which is transformed into terephthalic acid, if the oxidation is carried out further. For example Gresham (U.S. Pat. 2,479,067) and Loder (U.S. Pat. 2,245,528) manufacture phthalic acids by oxidation of toluic acids or xylenes. The yields mentioned in these patents are poor. Attempts have been made in the past to improve these yields and rates of reaction.

Nevertheless, in a field where competition is hard, each improvement as little as it may be, must be taken in consideration since this improvement may transform a non-economical process into an economical one.

It has now been discovered a very active composition of initiators for this oxidation.

This composition comprises at least two essential components in critical amounts:

(1) A ketone and preferably a methylalkylketone, for example methylethylketone, methylisopropylketone or methyldodecylketone.

(2) An aldehyde, preferably an aliphatic saturated aldehyde, for example acetaldehyde, butyraldehyde or capraldehyde.

The ketone preferably contains from 3 to 20 carbon atoms and the aldehyde from 2 to 20 carbon atoms.

In the past, catalytic systems have been proposed which contained either the component (1) or the component (2). Alternatively the two components were present in relatively low amounts. When such systems were used a small improvement in the oxidation yield could be observed.

It has now been found that if the components (1) and (2) are simultaneously employed in critical amounts, far higher yields and rates of reaction may be obtained.

This fact is particularly unexpected since the components (1) or (2), i.e. ketones and aldehydes, were deemed to be equivalent as regards their properties in catalytic systems formerly employed.

The critical amounts of initiators of this invention are given below:

For one part by weight of para-xylene, I use from 0.15 to 0.5 part of ketone and from 0.0001 to 0.1 part of aldehyde by weight.

My preferred amounts are about 0.25–0.5 part by weight of ketone and 0.001–0.01 part by weight of aldehyde per part by weight of para-xylene.

It has been noted, too, that the ratio ketone/aldehyde was not immaterial and that it was preferred to have this ratio greater than 3 (on a molecular basis) in order to get the greatest advantages of the invention, this molecular ratio remaining preferably less than 300.

For one part by weight of para-xylene I preferably use from 1 to 20 and preferably from 2 to 10 parts by weight of carboxylic acid, as solvent and from 0.01 to 1 and preferably from 0.02 to 0.2 part by weight of transition metal compound. The latter may be, for example, cobalt acetate, cobalt propionate, cobalt oleate, manganese naphthenate, cobalt bromide or manganese bromide.

Oxygen may be used as such or diluted with an inert gas, for example, in the form of air.

The other xylene oxidation conditions are well known and need not to be described in details. Known catalysts and additional initiators for this type of reaction may be used such as azo-bis-isobutyronitrile, bromide ions, bromine, peroxides, ethers and olefins.

Terephthalic acid may be recovered by any known process such as, for example, filtration, centrifugation and similar.

Without further elaboration, it is believed that one skilled in the art can, using the preceding description, utilize the present invention to its fullest extent.

The following preferred specific embodiments are, therefore, to be construed as merely illustrative, and not limitative, of the remainder of the specification and claims in any way whatsoever. Examples 3 and 4 are given by way of comparison but they do not fall within the scope of this invention.

EXAMPLE 1

The oxidation is carried out in a chromium steel reactor.

I have introduced in this reactor:

| | Kg. |
|---|---|
| Para-xylene | 15 |
| Cobalt acetate | 1.5 |
| Barium bromide | 1 |
| Methylethylketone | 3.75 |
| Ethanal | 0.05 |
| Acetic acid | 78.7 |

The liquid phase is maintained at 140° C. for 1 hour and a half while air is injected at a rate of 14 m.³/h.

After cooling and filtering 22.3 kg. of terephtalic acid and 0.5 kg. of paratoluic acid are recovered.

Paratoluic acid may be oxidized during the course of a further operation.

The results are not modified if ethanal is replaced with butyraldehyde or if methylethylketone is replaced with the same weight of methylisobutylketone.

EXAMPLE 2

Example 1 is repeated but barium bromide is replaced with 0.9 kg. of lead bromide. All other conditions being unchanged, no appreciable variation of the yield is observed.

EXAMPLE 3

Example 1 is repeated but without ethanal and with 3.80 kg. (instead of 3.75 kg.) of methylethylketone. All other conditions being unchanged only 14 kg. of terephthalic acid and 7.2 kg. of paratoluic acid are obtained after 3 hours.

EXAMPLE 4

Example 1 is repeated without using methylethylketone, but with 3.80 kg. of ethanal. All other conditions being unchanged only 13 kg. of terephthalic acid and 5.1 kg. of paratoluic acid are obtained after 3 hours.

EXAMPLE 5

Example 1 is repeated using the same catalytic system but changing the proportions of ketone and aldehyde; 3 kg. of methylethylketone and 0.8 kg. ethanal are used (the molar ratio ketone/aldehyde is 2.3).

All other conditions remaining the same there is obtained after one hour and a half, 21.8 kg. of terephthalic acid and 0.48 kg. of paratoluic acid.

EXAMPLE 6

Example 1 is repeated while changing the proportions of aldehyde and ketone which are taken equal to 0.005 kg. and 3.795 kg. respectively (molar ratio methylethylketone/ethanal equal to 465). After one hour and a half, only 21 kg. of terephthalic acid and 1.05 kg. of paratoluic acid were obtained.

Examples 3 and 4 show that the simultaneous presence of ketone and aldehyde is necessary to obtain the high yields and reaction rates according to the invention.

Examples 5 and 6 point out the importance of the molar ratio of these two additives; in these examples, the preferred values are not respected and a drop in the yield is noted by comparison with the yield obtained in Example 1.

EXAMPLE 7

I have operated substantially as disclosed in Gresham's example under the same operating conditions, that is to say a mixture containing 500 grams of glacial acetic acid, 68 grams of para-xylene, 0.5 gram of lead acetate and also containing propionaldehyde and ethylmethyl ketone, the proportions of which will be given hereunder, was placed in a pressure-resistant vessel and heated to a temperature of 180° C. Air was then injected into the mixture through an opening at the bottom of the vessel. The pressure on the mixture was maintained within the range of 750 to 500 lbs. per square inch by controlling the rate at which the exit gas was released from the reaction vessel. The injection of air was continued for a period of 3.4 hours. The reaction mixture was then withdrawn from the oxidizer, and filtered at a temperature of about 70° C. The reaction vessel was washed with dilute caustic and the wash liquor was acidified, yielding a precipitate of terephthalic acid.

The results were as follows:

| Example | Molar ratio ketone/ aldehyde | Wt. of ketone (grams) | Wt. of aldehyde (grams) | Conversion (molar) | Yields (by wt.) |
|---|---|---|---|---|---|
| A | [1] 0 | 0 | 17.24 | 53 | 79 |
| B | 0.805 | 0.5 | 0.5 | 18.5 | 93 |
| C | 0.805 | 8.62 | 8.62 | 74.5 | 97.5 |
| D | 2.3 | 12.76 | 4.48 | 84 | 111 |
| E | 45 | 16.93 | 0.31 | 89 | 115.5 |
| F | 465 | 17.20 | 0.04 | 82.5 | 110.5 |
| G | [2] ∞ | 17.24 | 0 | 49.5 | 95 |

[1] Without ketone.
[2] Without aldehyde.

Example B is identical with Gresham's molar ratio ketone/aldehyde and weight of ketone and aldehyde.

What I claim is:

1. In a process for manufacturing terephthalic acid by oxidation of para-xylene in liquid phase by means of a molecular oxygen containing gas, in a carboxylic acid solvent, at a temperature between 80 and 200° C., in the presence of a transition metal compound, the improvement comprising adding to the liquid phase, in combination, from 0.15 to 0.5 part by weight of a methylalkylketone having 3–20 carbon atoms and from 0.0001 to 0.1 part by weight of an aliphatic saturated aldehyde having 2–20 carbon atoms.

2. A process according to claim 1, wherein the molar ratio between the ketone and the aldehyde is comprised between 3 and 300.

3. A process according to claim 1, wherein the ketone is methylethylketone or methylisobutylketone.

4. A process according to claim 1, wherein the aldehyde is acetaldehyde.

5. A process according to claim 1, wherein from about 0.25 to 0.5 part by weight of ketone is used per part by weight of para-xylene.

6. A process according to claim 5, wherein from 0.001 to 0.01 part by weight of aldehyde is used per part by weight of para-xylene.

References Cited

UNITED STATES PATENTS

| | | | |
|---|---|---|---|
| 2,245,528 | 6/1941 | Loder | 260—524 |
| 2,479,067 | 8/1949 | Gresham | 260—524 |
| 2,853,514 | 9/1958 | Brill | 260—524 |

LORRAINE A. WEINBERGER, Primary Examiner

R. S. WEISSBERG, Assistant Examiner